United States Patent [19]

Rubin

[11] Patent Number: 4,587,396
[45] Date of Patent: May 6, 1986

[54] CONTROL APPARATUS PARTICULARLY USEFUL FOR CONTROLLING A LASER

[75] Inventor: Martin D. Rubin, Kfar Saba, Israel

[73] Assignee: Laser Industries Ltd., Tel Aviv, Israel

[21] Appl. No.: 534,718

[22] Filed: Sep. 22, 1983

[30] Foreign Application Priority Data

Dec. 31, 1982 [IL] Israel ..................................... 67599

[51] Int. Cl.$^4$ ............................................. B23K 26/00
[52] U.S. Cl. ........................ 219/121 LU; 219/121 L; 219/121 LY; 364/468; 346/76 L
[58] Field of Search .................. 219/121 LX, 121 LY, 219/121 LU, 121 LZ, 121 EU, 121 EV, 121 EW, 121 L; 364/468; 128/303.1; 346/76 L

[56] References Cited

U.S. PATENT DOCUMENTS

| | | | |
|---|---|---|---|
| 3,448,458 | 6/1969 | Carlson et al. | 346/108 |
| 4,380,696 | 4/1983 | Masaki | 219/125.1 |
| 4,392,476 | 7/1983 | Gresser et al. | 219/121 L X |
| 4,434,581 | 3/1984 | Spriggs | 51/284 R X |

FOREIGN PATENT DOCUMENTS

| | | | |
|---|---|---|---|
| 82/04266 | 12/1982 | PCT Int'l Appl. | 219/121 L X |
| 2099655 | 12/1982 | United Kingdom | 219/121 L X |

*Primary Examiner*—M. H. Paschall
*Attorney, Agent, or Firm*—Benjamin J. Barish

[57] ABSTRACT

Laser control apparatus for controlling a laser beam with respect to a working area to trace a desired pattern on a working area comprises an input device for inputting the desired pattern; a memory for storing a line pattern; a display for displaying the pattern; and a control system for controlling the laser beam. The control system comprises a Line-Operation selector and an Area-Operation selector, the Line-Operation selector being effective to cause the line pattern stored in the memory to be reproduced by the laser beam on the object, the Area-Operation selector being effective to cause the line pattern stored in the memory to be converted to an area pattern enclosing the area bounded by the line.

31 Claims, 7 Drawing Figures

CONTROL APPARATUS PARTICULARLY USEFUL FOR CONTROLLING A LASER

BACKGROUND OF THE INVENTION

The present invention relates to control apparatus for controlling a working tool with respect to a working area to produce a desired pattern thereon. The invention is particularly useful for controlling a laser and is therefore described below with respect to such an application, although it will be appreciated that the invention, or various features thereof as to be described below, could also advantageously be used in other applications.

Lasers are gaining widespread use in the medical field as surgical scalpels for cutting or burning-away tissue, and as coagulators for treating different kinds of lesions. Critical factors in the successful use of lasers for such purposes are the ease and precision by which the laser beam may be manipulated. In the existing systems, the laser beam is usually manipulated by a joystick. One construction including a joystick is illustrated in U.S. Pat. No. 4,228,341, assigned to the same assignee as the present application.

OBJECTS AND SUMMARY OF THE INVENTION

An object of the present invention is to provide novel control apparatus for controlling a laser beam with respect to a working area to trace a desired pattern thereon. As will be described below, the traced pattern may either be a line pattern or an area pattern, namely one in which the area within or bounded by a closed-loop line has been filled. Another object of the invention is to provide laser control apparatus for controlling the movement of a laser beam with respect to a working area, which apparatus is particularly useful as a surgical scalpel or as an evaporation and coagulation device for treatment of different kinds of lesions. A still further object of the invention is to provide such a pattern control apparatus which may be attached to an existing laser and which facilitates the control of the laser in a very convenient and precise manner.

According to a broad aspect of the present invention, there is provided control apparatus for controlling a laser beam with respect to an object to trace a desired pattern thereon, comprising: a manipulatible tracing device for manually inputting a desired pattern and for producing electrical signals in accordance with the inputted pattern; a memory for storing the inputted pattern; display means for displaying the pattern; and a control system for controlling the lasar beam. The control system comprises: (a) mode-selector means including a Manual-Mode selector; (b) operation-selector means including a Set-Operation selector: (c) and operation-control means including a control switch. The Manual-Mode selector is effective, when selected, to cause the apparatus to operate according to a Manual Mode wherein the movement of the manipulatible device traces the pattern on the object; the Set-Operation selectors is effective, when selected, to cause the apparatus to produce a Set Operation wherein the movement of the tracing device is stored in the memory and is exhibited by the display means; and the control switch is effective, when actuated, to control the energization of the laser beam in accordance with the pattern traced on the object during the Manual Operation, or stored in the memory during the Set Operation.

In the preferred embodiment of the invention described below, the mode selector means further includes a Verify-Operation selector effective, when actuated following a Set Operation but before the energization of the working tool by the control switch, to perform a Verify-Operation in which the pattern stored in the memory is analyzed for the presence of predetermined unacceptable characteristics which are automatically corrected before the laser beam is energized by the actuation of the control switch. For example, as described the predetermined unacceptable characteristics include a gap between the ends of the traced pattern, which gap is automatically closed by the control system, and trailing ends in the closed loop of the traced pattern, which trailing ends are automatically removed by the control system.

According to another feature in the preferred embodiment of the invention described below, the mode selector means further includes a Line-Operation selector and an Area-Operation selector; the Line Operation selector being effective, when selected, to cause the pattern stored in the memory to be a line pattern corresponding to the line traced by the tracing device; the Area-Operation selector being effective, when selected, to cause the pattern stored in the memory to be converted to an area pattern enclosing the area bounded by the traced line.

As will be more particularly described below, the invention provides a number of important advantages when applied to a laser for controlling a laser beam in order to trace a desired pattern, either a line pattern or an area pattern.

According to a further aspect of the invention, therefore, there is provided laser control apparatus for controlling a laser beam with respect to a working area on an object to trace a desired pattern thereon, comprising: an input device for inputting the desired pattern; a memory for storing a line pattern; display means for displaying the pattern; and a control system including a control switch for controlling the laser beam. The control system comprises a Line-Operation selector and an Area-Operation selector; the Line-Operation selector being effective, when selected, to cause the line pattern stored in the memory to be reproduced by the laser beam on the object; the Area-Operation selector being effective, when selected, to cause the line pattern stored in the memory to be converted to an area pattern enclosing the area bounded by the line, which area pattern is reproduced by the laser beam on the object.

Further features and advantages of the invention will be apparent from the description below.

THE DRAWINGS

The invention as herein described, by way of example only, with reference to the accompanying drawings, wherein.

DESCRIPTION OF A PREFERRED EMBODIMENT

General Construction

Figures 1, 5, 6:
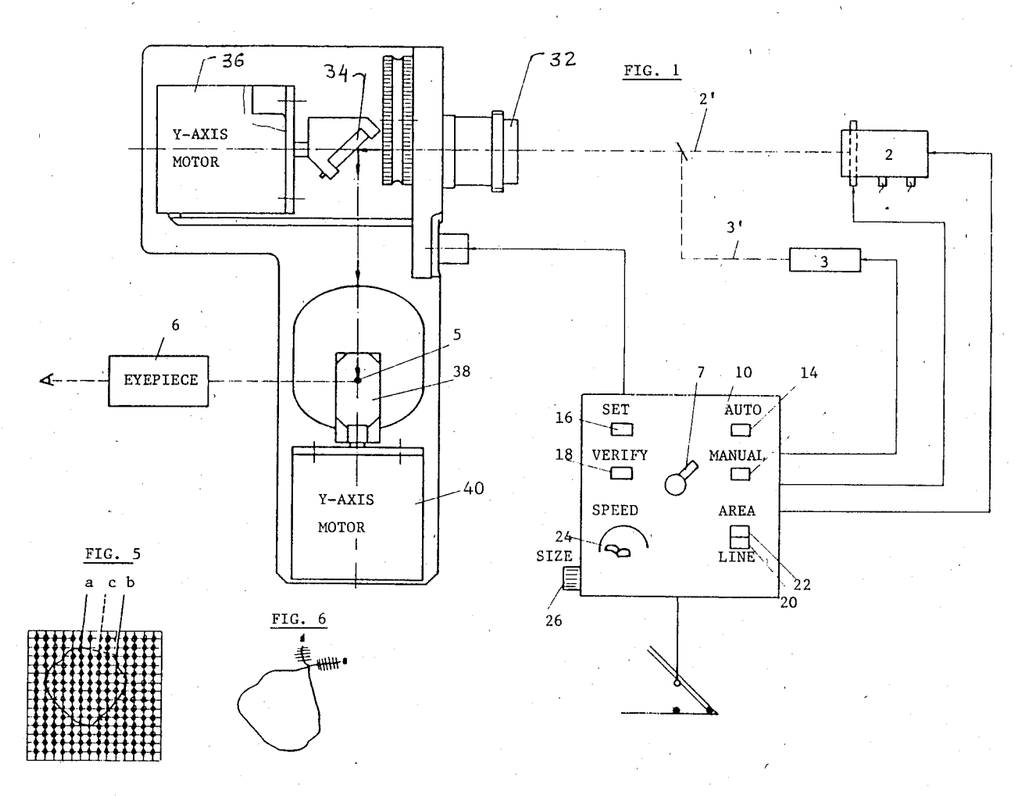
FIG. 1 illustrates one form of a laser control system constructed in accordance with the invention particularly useful for surgical purposes.
FIG. 5 illustrates the manner of storing the pattern to be traced by the laser beam, and also one step in the verification of that pattern.
FIG. 6 illustrates another step in the verification of the traced pattern.

With reference first to FIG. 1, there is illustrated a surgical laser system which may be used as a surgical scalpel or as a surgical evaporation and coagulation device for the treatment of different kinds of lesions. The system comprises a high-energy laser tube, generally designated 2, for generating a high-energy working laser beam 2', and a low-energy laser tube, generally designated 3, for generating a visible guiding beam 3' which indicates or displays to the surgeon the points to be exposed by the working laser beam 2' when laser 2 is energized; for example, the working laser 2 may be of the $CO_2$-type, and the guiding laser may be of the He—Ne type.

The apparatus illustrated in FIG. 1 further includes an optical unit, generally designated 4, for directing both laser beams to a working area, generally designated 5, on an object to be lased, e.g., tissue to be cut, burnt-away, or coagulated. The working area 5 is viewable to the surgeon via an eyepiece 6, which may be a binocular microscope or a colposcope; alternatively, the surgeon may view the working area directly. Both the working laser beam 2' and the guiding beam 3' are manipulatible by the surgeon via a joystick 7; and the energization of the working laser beam 2' is controlled by the surgeon via a foot switch 8.

Control Unit 10

The apparatus illustrated in FIG. 1 further includes a control unit 10 for controlling the working laser beam 2', and also the guiding laser beam 3'. In the arrangement illustrated in FIG. 1, the joystick 7 is included within the control unit 10, but in many applications it may be desired to attach it to the optical control unit 4 in a convenient location for manipulation by the surgeon as he views the working area 5 via the eyepiece 6 or directly.

Besides the joystick 7, the control unit 10 includes mode-selector means for selecting either a Manual Mode, by the depression of MANUAL key 12, or an Automatic Mode, by the depression of AUTO key 14. Briefly, when the Manual Mode is selected by depressing key 12, the movement of the joystick 7 causes the working laser beam 2', as well as the guiding laser beam 3' to trace the same pattern on the object within the working area 5; whereas during an Automatic-Mode of operation, the movement of the joystick is stored in a memory for subsequent processing, as desired, and then used to control the working and guiding laser beams.

Control unit 10 further includes operation-selectors for selecting certain operations particularly during the Automatic Mode. These operation selectors include a Set-Operation selector key 16 and a Verify-Operation selector key 18. Briefly, when the Set-Operation key 16 is depressed during an Automatic Mode, the movement of the joystick 7 is stored in the memory and is exhibited to the surgeon by the guiding laser beam 3' but the working laser 2' is normally not energized so that no actual cutting or burning is produced. When the Verify-Operation key 18 is depressed, following a Set Operation but before the energization of the working laser 2, the control system performs a Verify Operation during which the pattern stored in the memory during the Set Operation is analyzed for the presence of predetermined unacceptable characteristics, which, if found, are automatically corrected before the laser is energized.

The operation-selector keys on the control unit 10 further include a Line-Operation selector key 20 and Area-Operation selector key 22, both of which are effective only during a Verify-Operation. Thus, if a Line-Operation is selected by depressing key 20, the pattern produced by the manipulation of joystick 7 and stored in the memory remains as a line pattern, so that when the working laser 2 is energized, it reproduces a line pattern on the object within the working area. On the other hand, if the Area-Operation key 22 has been depressed, then during the Verify Operation the line pattern stored in the memory will be converted to an area pattern, namely, the area bounded by the traced line, so that when the working laser 2 is energized it will reproduce or trace an area rather than a line. This option of providing either area coverage of the laser beam, or line coverage, is particularly important in certain medical applications of the laser, for example in dermatological applications. It will be appreciated that instead of two keys 20, 22, a single alternate-action switch may be provided.

Control unit 10 further includes a Speed-Selector knob 24 and a Size-Selector knob 26. Briefly, the Speed-Selector knob 24 may be used for preselecting the speed with which the laser traces the pattern, either a line pattern or an area pattern, on the object within the working area; and Size Selector knob 26 may be used to preselect the size of the pattern to be traced on the object relative to that traced by the joystick 7.

Also to be described at this point are two control keys normally provided on the working laser 2, namely a Standby key 28 which, when depressed, inhibits the operation of the working laser, and a Continuous key 30 which, when depressed, permits the laser to be energized to produce a continuous laser beam.

The Mode-Selector keys 12 and 14, and the Operation-Selector keys 16, 18, 20 and 22, may all be in the form of depressible buttons each illuminated by an indicator light contained within the button when depressed so as to indicate to the viewer the particular mode and operation selected.

All the foregoing modes of operation and controls provided by control unit 10 will be described more particularly below with respect to a description of a specific sequence of operations as illustrated in the state flow chart of FIG. 4.

Optical Unit 4

Figure 2:
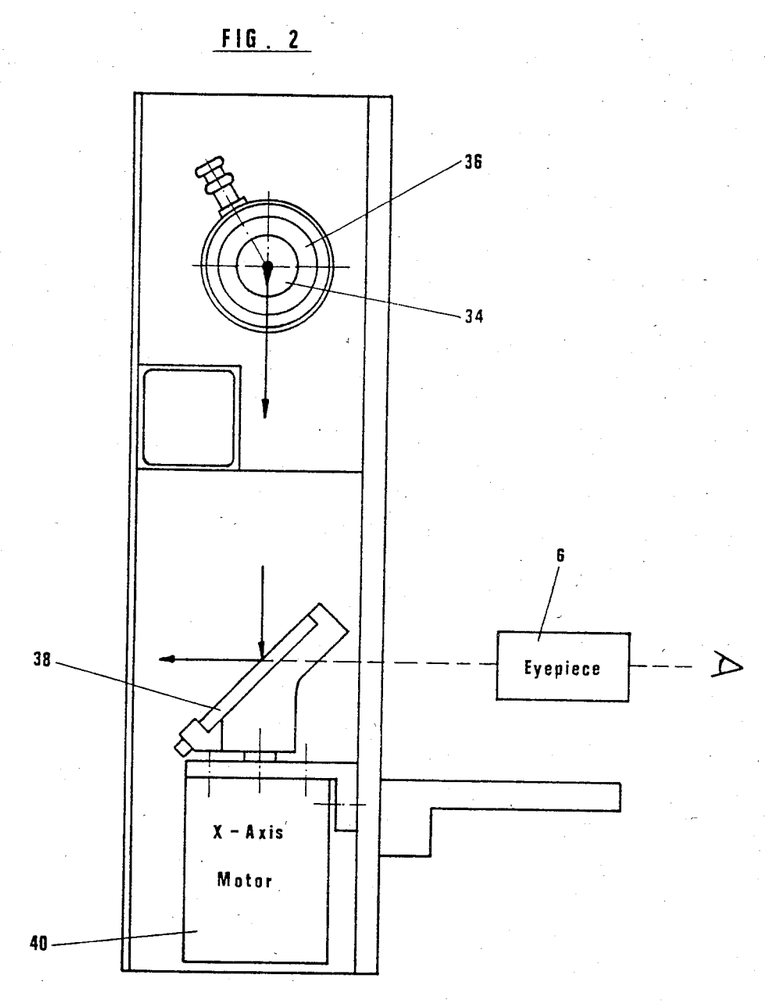
FIG. 2 is a side elevational view illustrating the electro-optical unit in the system of FIG. 1 for controlling the movement of the laser beam.

The optical unit 4 includes an inlet fitting 32 through which both the working laser beam 2' and guiding laser beam 3' are directed, to impinge on a first reflector 34 driven by a Y-axis (vertical) motor 36 and a second reflector 38 driven by an X-axis (horizontal) motor 40. Reflector 34 is effective to deflect the laser beams along the vertical axis in accordance with the amount of current received by its motor 36; and reflector 38 is effective to deflect the laser beams along the horizontal axis according to the current received by its motor 40. Thus, by controlling both motors 36 and 40, the laser beam may be caused to scan a field within the working area 5 along both the X-axis and the Y-axis.

The working laser 2 further includes a shutter 42 which, unless actuated, blocks the passage of the working laser beam 2' to the inlet 32 of the optical scanner unit 4. Such shutters are normally provided for protective purposes, to prevent unintentional exposure to the working laser beam.

Figure 3:
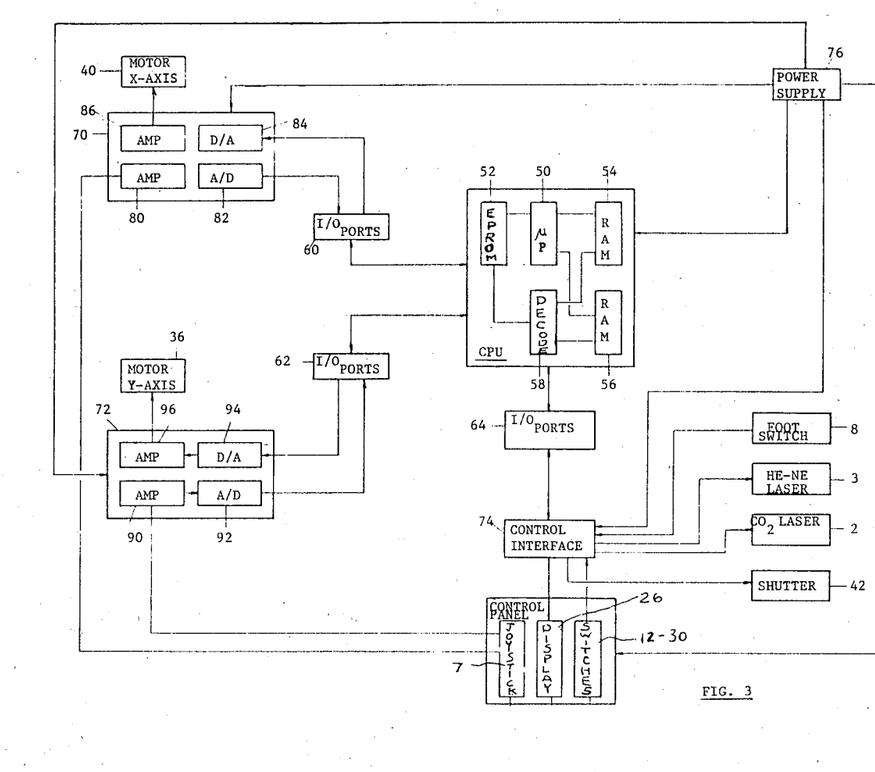
FIG. 3 is a block diagram illustrating the electrical control system in the apparatus of FIG. 1.

Control System of FIG. 3

The working laser unit 2, its shutter 42, and the motors 36 and 40 controlling the deflection of the laser beams 2' and 3' by reflectors 34, 38, are all controlled by a control system, illustrated in FIG. 3, included within the control unit 10 of FIG. 1.

Thus, the control system illustrated in FIG. 3 includes a Central Processing Unit CPU having: a microprocessor 50 an EPROM (Erasable Programmable Read Only Memory) 52 for storing the program of the microprocessor; a RAM (Random Access Memory) unit 54 for storing the pattern inputted by the joystick 7; another RAM unit 54 for storing necessary temporary information in the operation of the microprocessor; and a decoder unit 58 for address decoding and the like. Communication from and to the Central Processor Unit CPU is effective via Input-Output (I/O) ports 60, 62 and 64. I/O port 60 communicates with a control unit 70 for the X-axis motor 40; and I/O port 62 communicates with a control unit 72 for the Y-axis motor 36. I/O ports 64 are connected, via an interface unit 74, to the display unit 26 and the switches 12–28 on the control unit 10.

The CPU also controls, via I/O ports 64 and control interface 74, the energization of the working laser tube 2, and the shutter 42 on the working laser tube 2. The CPU is in turn controlled, not only by the joystick 7, the mode-selector keys 12 and 14, the operation-selector keys 16, 18, 20 and 22, and the control knobs 24 and 26, on the control unit 10, but also by the foot-pedal switch 8 operated by the surgeon.

FIG. 3 also illustrates a power supply 76 for supplying power to all the foregoing units.

Joystick 7 may be of any known type which produces a first analog signal representing the horizontal component of its displacement, and a second analog signal representing the vertical component of its displacement. The first electrical signal is fed from joystick 7 to an amplifier 80 in control circuit 70 for the X-axis motor 40. The later circuit includes an analog-to-digital converter 82 which converts the analog signal to digital form before it is applied via I/O ports 60 to the CPU, where the information is processed, as will be described more particularly below. The CPU outputs the control information back to analog form, before it is applied via amplifier 86 to the X-axis motor 40.

Similarly, the analog signal representing the vertical component of displacement of the joystick 7 is fed to the Y-axis motor control circuit 72 where it is amplified in amplifier 90, converted to digital form in converter 92, fed to the CPU via I/O port 62, and returned therethrough to digital-to-analog converter 94 before being applied in analog form via amplifier 96 to the vertical motor 36.

Overall Operation

The overall operation of the illustrated apparatus will now be described particularly with reference to the control unit 10 and the control system illustrated in FIG. 3.

Before the apparatus is operated, the particular mode of operation and other controls are first pre-selected by means of the control unit 10. If a Manual Mode is desired, key 14 is depressed whereupon the surgeon controls the position of the working laser beam via the joystick 7 and the CPU, but without storing these movements in the RAM 54. The Manual Mode may be selected at any time, even in the middle of an Automatic Mode of operation, to enable the surgeon to directly control the position of the beam manually. Thus, whenever MANUAL button 14 is depressed, the control unit stores the current mode and allows the surgeon to directly control the position of the beam by manipulating joystick 7. As soon as this direct control has been completed, the surgeon need only depress the Automatic Mode key 12 to return the apparatus to the previous Automatic Mode preselected, and the previous position of the laser beam before that mode was overriden by depressing the MANUAL key 14.

When the apparatus is to be operated according to the Automatic mode, AUTO key 12 is depressed; also the Set-Operation key 16 should be depressed. Depressing the latter key causes the apparatus to perform a Set Operation, wherein the movements of the joystick 7 are stored in RAM 54 via a feed path including the analog-to-digital converters 82, 92 of the horizontal and vertical control circuits 70, 72. Depressing the Set-Operation key 16 at any time causes the CPU to erase any previously stored pattern in RAM 54, thereby enabling the latter to store a new pattern introduced by the manipulation of the joystick 7.

RAM 54, storing the pattern traced by the joystick 7, may be a 64-by-64-bit matrix of bi-stable storage elements effective to store the traced line pattern in the form of a plurality of matrix points, each assuming one of two stable states. This is illustrated in FIG. 5, wherein it will be seen that all the matrix points coinciding with a point of the line pattern assume the binary state "1", whereas all the other points of the matrix assume the binary state "0".

Next, the Verify-Operation key 18 should be depressed in order to cause the system to perform a Verify Operation. During this operation, the system analyzes the pattern stored in RAM 54 to determine whether the stored pattern includes certain unacceptable characteristics, and if so, it automatically corrects them.

Thus, one characteristic checked in the stored pattern is whether there is a gap between the ends of a traced line; in FIG. 5, such a gap is shown between ends "a" and "b" of the traced line. When such a gap is found to be present, the control system automatically fills in the gap, shown by the broken-line "c" in FIG. 5, by any suitable technique, such as known in pattern-recognition or character-recognition systems.

Another unacceptable characteristic checked during the Verify Operation is to see whether the stored pattern includes trailing ends, such as shown at "d" and "e" of FIG. 6. If trailing ends are found to be present, the system automatically removes them by any suitable procedure, such as also known in pattern-recognition or character-recognition systems.

The Verify Operation also involves checking to see whether the Line-Operation key 20 or the Area-Operation key 22 has been depressed. If the former, then nothing is changed in RAM 54; but if the latter, then the system automatically fills in the area enclosed within the line pattern stored in RAM 54 by changing all the 0's within the line pattern to 1's. Thus, when the foot switch 8 is depressed by the surgeon to energize the working laser 2, the pattern reproduced on the object will be an area pattern, namely defined by the area within the line pattern traced by the joystick 7.

During a Line Operation produced by depressing key 20, the X-axis motor 40 and Y-axis motor 36 are controlled so as to move their reflectors 34, 38 such as to cause the guiding laser beam 3', and also the working laser beam 2' if energized, to follow the line pattern stored within RAM 54; any known line-following technique may be used for this purpose. However, during an Area Operation produced by depressing key 22, motors 36 and 40 are controlled so as to move their reflectors 34 and 38 to cause the guiding laser beam 3', and the working laser beam 2' if energized, to scan the working area 5, by first effecting a horizontal scan along a plurality of horizontal lines and then a vertical scan along a plurality of vertical lines. Thus, the complete area within the line pattern stored in RAM 54 will be illuminated by the guiding laser beam 3', and also will be lased or burnt by the working laser beam 2' if the working laser 2 is energized.

It will thus be seen that the guiding laser 3 is continuously energized, but the working laser 2 is energized only when the foot switch 8 is closed by the surgeon, assuming that the working laser 2 is operating under its continuous mode by depressing its Continuous-Mode key 30 and is not operating under the Standby Mode by depressing its Standby-Mode key 28. If the Standby-Mode key is depressed, this inhibits the operation of the working laser 2.

The horizontal and vertical scanning occurring during the Area Operation described above is also initiated by the depression of foot switch 8. Thus, if the surgeon wishes merely to see the area to be lased according to the area pattern stored in RAM 54, he would depress the Standby-Mode key 28 on the working laser 2 before he depresses the foot switch 8, whereupon the scanning operation described above will occur but the working laser will be inhibited.

Normally, the working laser 2 would not be energized by operation of the footswitch 8 until both the above-described Set Operation and Verify Operation have been completed, the former storing the pattern in RAM 54, and the latter operation analyzing, correcting and exhibiting the stored pattern to the surgeon. However, it is possible for the surgeon also to energize the working laser during a Set Operation, by merely depressing the footswitch 8 at the same time he manipulates the joystick 7, in which case the working laser beam 2' will follow the line produced by the manipulation of joystick 7, while at the same time this manipulation is stored within RAM 54. If, however, the surgeon does not wish to store this pattern, he would operate the system according to the Manual Mode by depressing the Manual switch 12.

Figure 4:
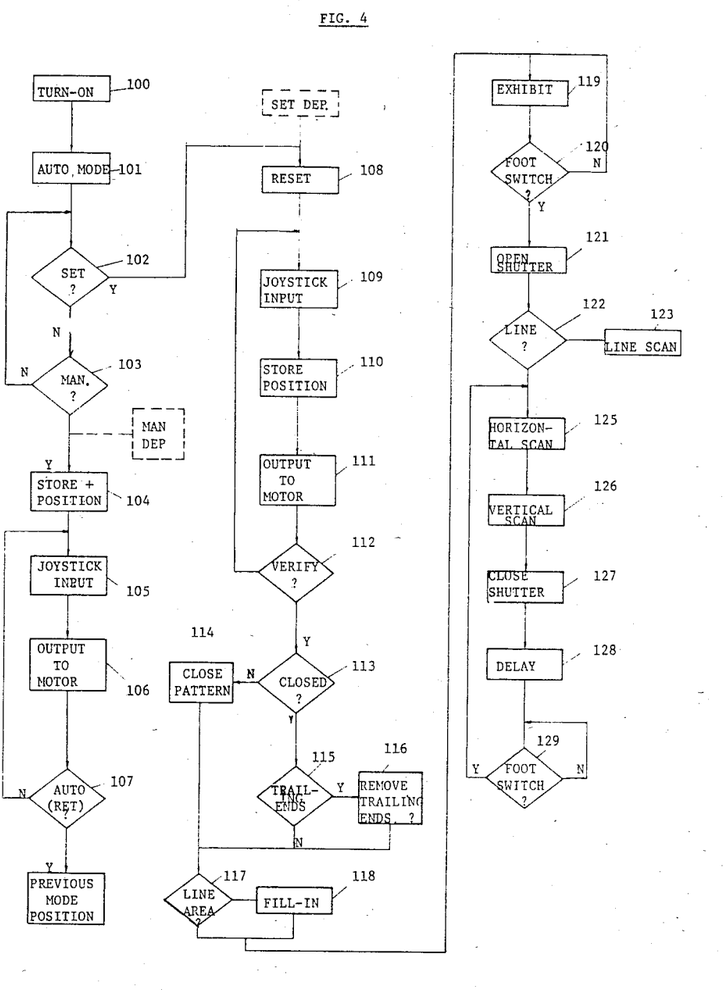
FIG. 4 is a state flow chart illustrating the operation of the apparatus of FIG. 1.
Figure 4A:
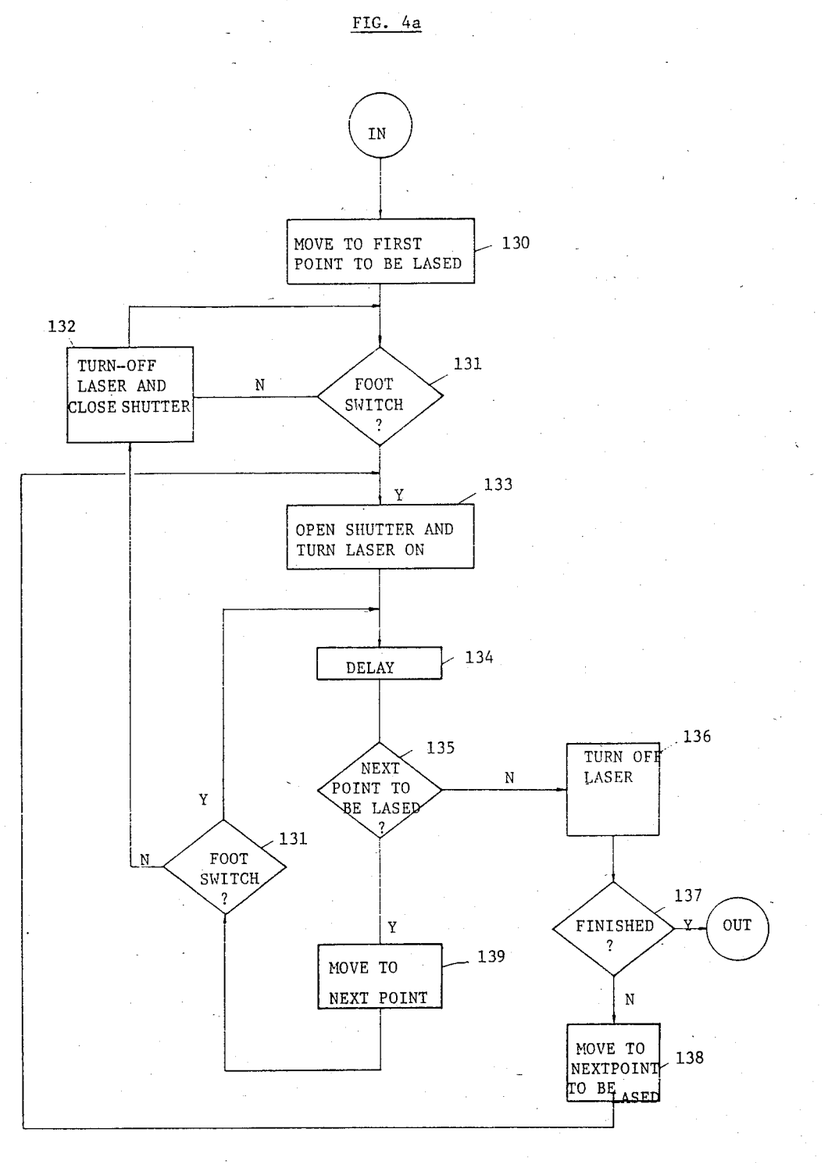
FIG. 4a is a state flow chart illustrating the operation of the apparatus during horizontal, vertical, and line scans of the working laser beam.

State Flow Chart (FIGS. 4, 4a)

FIG. 4 illustrates a state flow chart for the overall operation of the described apparatus, and FIG. 4a illustrates a state flow chart for a horizontal scan, vertical scan or line scan.

Thus, with reference first to FIG. 4, it will be seen that on "turn-on" (state 100), the apparatus automatically enters the Automatic Mode (102) and checks to see whether the Set-Operation key 16 has been depressed. If so, it performs a Set Operation; but if not, it checks to see whether the Manual-Mode key 12 has been depressed (state 103). If so, it performs a Manual-Mode operation wherein it stores this mode and position (state 104), receives the input from the joystick 7 (state 105), and outputs the processed information to the motors 36 and 40 (state 106) to control the reflectors 34 and 38 in order to reproduce the pattern produced by the movement of the joystick 7. The system continuously checks to see whether the Automatic-Mode key 12 has been depressed (state 107), and if not, it goes back to state 105 wherein the inputs are applied from the joystick to the CPU for controlling the motors 36 and 40. If the Automatic-Mode key 14 has been depressed, however, the system returns to the previous mode and position, i.e., before depression of the Manual-Mode key 12.

When the system is operating according to the Automatic Mode and finds, when in state 102, that the Set-Operation key 16 has been depressed, a Set Operation is performed, wherein the CPU is cleared and the pattern stored within RAM 54 is erased (state 108), the inputs from the joystick 7 are applied to the CPU (state 109), stored within RAM 54 (state 110), and outputted to the motors 36 and 40 (state 111).

The system also continuously checks to see if the Verify-Operation key 18 has been depressed (state 112), and if not, it returns to state 109 to apply the inputs from the joystick 7. If the Verify-Operation key 112 has been depressed, however, the system performs a Verify Operation, wherein it checks to see if the pattern stored within RAM 54 is closed (state 113), and if not, it closes it (114); it also checks to see whether there are any trailing ends in the stored pattern (state 115), and if so, it removes them (state 116).

The system then checks to see whether a Line Operation has been specified by the depression of key 20 or an Area Operation has been specified by depression of key 22 (state 117). In the case of any Area Operations, the system then fills-in the area of the pattern stored in the RAM matrix 54 by changing the 0's within the line pattern to 1's, as described above (state 118).

The pattern stored in RAM 54, whether a line pattern or an area pattern, is exhibited to the surgeon by means of the guiding laser beam 3' (state 119). If the pattern is satisfactory to the surgeon, he can operate the footswitch 8 (state 120), but if the footswitch is not operated, nothing occurs except that the exhibition of the pattern is repeated and continued.

When the surgeon does operate the footswitch 8, this causes the shutter 42 on the working laser tube 2 to be opened (state 121) to expose the tissue within the working area 5 to the high-intensity working laser beam 2'. The system then checks to see whether the Line-Operation key 22 has been depressed (state 122). If the former, a line scan is performed (state 123); and if the latter, a horizontal scan is performed (state 125), followed by a vertical scan (state 126), whereupon the shutter 42 is automatically closed (state 127). After a short delay (state 128), the system checks to see whether the footswitch 8 is still depressed (state 129), and only if it is does it return to repeat the horizontal and vertical scans.

FIG. 4a illustrates the system operation while performing both the horizontal and vertical scans during an Area Operation, or while performing a line scan during a Line Operation. Thus, the scanner finds the first point to be scanned (state 130) and then checks to see whether the footswitch 128 is depressed (state 131). If not, it turns off the working laser 2, and closes its shutter 42 (state 132), and returns to state 131. If the footswitch, however, has been depressed, the system opens the shutter 42 and turns on laser 2 thereby exposing the tissue to the laser beam (state 133).

After a short delay (state 134), the system checks to see whether the next point in the scan is to be lased (state 135); if not, it turns off the working laser 2 (state 136), whereupon the system checks to see whether the tracing of the pattern has been completed (state 137); if not, it moves to the next point to be lased (state 138), opens the shutter, and again turns on the laser (state 133). If, however, after the delay (state 134) the next point is to be burned, it moves to the next point (state 139) and checks the footswitch: if closed, returns back to state 134; if open, turns off the laser.

It will be appreciated that the footswitch 8 may be released at any time during the actual scanning by the working laser beam 2', which will interrupt the scanning and de-energize the working laser tube 2; when the footswitch 8 is again depressed, the scanning and lasing will resume where left off. Also, the Set Operation may be initiated at any time by depressing key 16, whereupon the apparatus will proceed to state 108 wherein the system is re-set and the previous stored pattern is erased.

While the invention has been described with respect to one preferred embodiment, involving the operation of a laser for medical purposes, it will be appreciated that the invention, or various features thereof, could advantageously be used in other applications, for example in industrial applications of lasers, or industrial applications of other working tools to be controlled according to patterns inputted manually or otherwise. Many other variations, modifications and applications of the invention will be apparent.

What is claimed is:

1. Control apparatus for controlling a laser beam with respect to an object to trace a desired pattern thereon, comprising:
    a manipulatable tracing device for manually inputting a desired pattern and for producing electrical signals in accordance with the inputted pattern;
    a memory for storing the inputted pattern;
    display means for displaying the pattern;
    and a control system for controlling the laser beam; said control system comprising:
    (a) mode-selector means including a Manual-Mode selector;
    (b) operation-selector means including a Set-Operation selector;
    (c) and operation-control means including a control switch;
    said Manual-Mode selector including means effective, when selected, to cause the apparatus to operate according to a Manual-Mode wherein the movement of the tracing device traces said pattern on the object;
    said Set-Operation selector including means effective, when selected, to cause the apparatus to produce a Set Operation wherein the movement of the tracing device is stored in said memory and is exhibited by the display means;
    said control switch including means effective, when actuated, to control the energization of the laser beam in accordance with said pattern traced on the object during said Manual Mode of Operation, and stored in said memory during said Set Operation.

2. Apparatus according to claim 1, wherein said operation-selector means (b) further includes a Verify-Operation selector including means effective, when actuated following a Set Operation but before the energization of the laser beam by the control switch, to perform a Verify Operation in which the pattern stored in the memory is analyzed for the presence of predetermined unacceptable characteristics, said control system including further means for automatically correcting said predetermined unacceptable characteristics before the laser beam is energized by the actuation of the control switch.

3. Apparatus according to claim 2, wherein said predetermined unacceptable characteristics include a gap between the ends of the traced pattern, which gap is automatically closed by the control system.

4. Apparatus according to claim 2, wherein said predetermined unacceptable characteristics include trailing ends in the closed loop of the traced pattern, which trailing ends are automatically removed by the control system.

5. Apparatus according to claim 1, wherein said operation-selector means (b) further includes a Line-Operation selector and an Area-Operation selector;
    said Line-Operation selector including means effective, when selected, to cause the pattern stored in the memory to be a line pattern corresponding to the line traced by the tracing device;
    said Area-Operation selector including means effective, when said selected, to cause the pattern stored in the memory to be converted to an area pattern enclosing the area bounded by the traced line.

6. Apparatus according to claim 5, wherein said memory includes a rectangular matrix of bi-stable elements effective to store the line pattern traced by the tracing device in the form of a plurality of matrix points assuming one of two stable states.

7. Apparatus according to claim 6, wherein said control means further includes means effective, when the Area-Operation selector has been selected, to convert the stored line pattern into an area pattern by causing all the matrix points bounded by those of the traced line pattern also to assume said one stable state.

8. Apparatus according to claim 1, wherein said operation control means (c) further include a size selector effective to select the size of the pattern to be traced on the object relative to that traced by the tracing device.

9. Apparatus according to claim 1, wherein said operation control means (c) further include a speed selector effective to select the speed by which the laser beam traces on the object the pattern stored in the memory.

10. Apparatus according to claim 1, wherein said tracing device is a joystick.

11. Apparatus according to claim 1, wherein said laser beam is generated by a high-energy laser, and is controlled by movable reflector means, the energization of the laser and the movement of the reflector means being controlled by said control system.

12. Apparatus according to claim 11, wherein said control system controls the reflector means to cause the laser beam to scan a field, and controls the laser to energize same at the points of the scanned field corresponding to the pattern to be traced.

13. Apparatus according to claim 12, wherein said reflector means comprises an X-axis reflector and a Y-axis reflector driven by X-axis and Y-axis motors, respectively, both controlled by said control system.

14. Apparatus according to claim 13, wherein said control system controls the reflector means to effect the scanning of the field along a plurality of horizontal lines and also along a plurality of vertical lines.

15. Apparatus according to claim 11, wherein said display means includes means for generating a low-energy visible laser beam, which latter beam is also controlled by said reflector means to cause it to scan the respective field.

16. Apparatus according to claim 11, wherein said control switch is a foot-operated switch.

17. Apparatus according to claim 11, wherein said control system further includes shutter control means for controlling a shutter on said high-energy laser to permit passage of the laser beam to the working area only at the points corresponding to the pattern being traced.

18. Laser control apparatus for controlling a laser beam with respect to a working area on an object to trace a desired pattern thereon, comprising:
   an input device for inputting the desired pattern;
   a memory for storing a line pattern;
   display means for displaying the pattern;
   and a control system including a control switch for controlling the laser beam; said control system comprising a Line-Operation selector and an Area-Operation selector;
   said Line-Operation selector including means effective, when selected, to cause the line pattern stored in the memory to be converted to an area pattern enclosing the area bounded by the line, which area pattern is reproduced by said laser beam on said object.

19. Laser control apparatus according to claim 18, wherein said control system further comprises a Set-Operation selector and a Verify-Operation selector;
   said Set-Operation selector being effective to produce a Set-Operation wherein the input of the input device is stored in said memory and is exhibited by the display means;
   said Verify-Operation selector being effective, when actuated following a Set Operation but before the energization of the laser beam by the control switch, to perform a Verify Operation in which the pattern stored in the memory is analyzed for the presence of predetermined unacceptable characteristics which are automatically corrected before the laser is energized to reproduce the pattern on the object.

20. Apparatus according to claim 18, wherein said input device is a joystick for manually tracing the desired pattern.

21. Apparatus according to claim 20, wherein said memory includes a rectangular matrix of bistable elements effective to store the line pattern traced by the joystick in the form of a plurality of matrix points assuming one of two stable states.

22. Apparatus according to claim 21, wherein said control means further includes means effective, when the Area-Mode selector has been selected to convert the stored line pattern into an area pattern by causing all the matrix points bounded by those of the traced line pattern also to assume said one stable state.

23. Apparatus according to claim 20, wherein said operation control means further includes a size selector effective to select the size of the pattern to be reproduced on the object relative to that traced by the manipulatible device.

24. Apparatus according to claim 20, wherein said operation control means further includes a speed selector effective to select the speed by which the laser beam reproduces on the object the pattern stored in the memory.

25. Apparatus according to claim 20, wherein said laser beam is controlled by movable reflector means, the energization of the laser and the movement of the reflector means being controlled by said control system.

26. Apparatus according to claim 25, wherein said control system controls the reflector means to cause the laser beam to scan a field, and controls the laser to energize same at the points of the scanned field corresponding to the pattern to be traced.

27. Apparatus according to claim 26, wherein said reflector means comprises an X-axis reflector and a Y-axis reflector driven by X-axis and Y-axis motors, respectively, both controlled by said control system.

28. Apparatus according to claim 27, wherein said control system controls the reflector means to effect the scanning of the field along a plurality of horizontal lines and also along a plurality of vertical lines.

29. Apparatus according to claim 26, wherein said display means includes means for generating a low-energy visible laser beam. which latter beam is also controlled by said reflector means to cause it to scan the respective field.

30. Apparatus according to claim 26, wherein said control switch is a foot-operated switch.

31. Apparatus according to claim 26, wherein said control system further includes shutter control means for controlling a shutter on said high-energy laser to permit passage of the laser beam to the working area only at the points corresponding to the pattern being traced.

* * * * *